United States Patent
Gurney et al.

(10) Patent No.: US 8,821,736 B1
(45) Date of Patent: Sep. 2, 2014

(54) METHOD FOR MAKING A PERPENDICULAR MAGNETIC RECORDING DISK WITH TEMPLATE LAYER FORMED OF NANOPARTICLES EMBEDDED IN A POLYMER MATERIAL

(71) Applicant: HGST Netherlands B.V., Amsterdam (NL)

(72) Inventors: Bruce Alvin Gurney, San Jose, CA (US); Dan Saylor Kercher, Santa Cruz, CA (US); Alan C Lam, San Jose, CA (US); Ricardo Ruiz, Santa Clara, CA (US); Manfred Ernst Schabes, Saratoga, CA (US); Kentaro Takano, San Jose, CA (US); Shi-Ling Chang Wang, San Ramon, CA (US); Qing Zhu, Austin, TX (US)

(73) Assignee: HGST Netherlands B.V., Amsterdam (NL)

( * ) Notice: Subject to any disclaimer, the term of this patent is extended or adjusted under 35 U.S.C. 154(b) by 23 days.

(21) Appl. No.: 13/772,145

(22) Filed: Feb. 20, 2013

(51) Int. Cl.
*B44C 1/22* (2006.01)
*G11B 5/855* (2006.01)

(52) U.S. Cl.
CPC ..................................... *G11B 5/855* (2013.01)
USPC .................................. 216/22; 216/58; 216/67

(58) Field of Classification Search
CPC ........ G11B 5/85; G11B 5/855; G11B 5/8404; C23C 14/021; C23C 14/024
USPC ............................................... 216/22, 58, 67
See application file for complete search history.

(56) References Cited

U.S. PATENT DOCUMENTS

| | | | |
|---|---|---|---|
| 7,175,925 B2 | 2/2007 | Chen et al. | |
| 7,431,999 B2 | 10/2008 | Iwasaki et al. | |
| 7,776,388 B2 | 8/2010 | Dobisz et al. | |
| 7,799,446 B2 | 9/2010 | Mukai | |
| 8,048,546 B2 | 11/2011 | Albrecht et al. | |
| 2008/0305365 A1 | 12/2008 | Yamazaki et al. | |
| 2009/0206513 A1* | 8/2009 | Tamura et al. | 264/219 |
| 2009/0226606 A1 | 9/2009 | Inamura | |
| 2010/0135937 A1 | 6/2010 | O'Brien et al. | |
| 2013/0149492 A1* | 6/2013 | Yoon et al. | 428/137 |

OTHER PUBLICATIONS

Wang et al, "Understanding Noise Mechanism in Small Grain Size Perpendicular Thin Film Media", IEEE Trans Mag 46, 2391 (2010).
D. V. Talapin, MRS Bulletin 37, 63-71 (2012).

(Continued)

*Primary Examiner* — Shamim Ahmed
(74) *Attorney, Agent, or Firm* — Thomas R. Berthold

(57) ABSTRACT

A method for making a perpendicular magnetic recording disk includes forming a template layer below a Ru or Ru alloy underlayer, with a granular Co alloy recording layer formed on the underlayer. The template layer is formed by depositing a solution of a polymer with a functional end group and nanoparticles, allowing the solution to dry, annealing the polymer layer to thereby form a polymer layer with embedded spaced-apart nanoparticles, and then etching the polymer layer to a depth sufficient to partially expose the nanoparticles so they protrude above the surface of the polymer layer. The protruding nanoparticles serve as controlled nucleation sites for the Ru or Ru alloy atoms. The nanoparticle-to-nanoparticle distances can be controlled during the formation of the template layer. This enables control of the Co alloy grain diameter distribution as well as grain-to-grain distance distribution.

24 Claims, 7 Drawing Sheets

(56) References Cited

OTHER PUBLICATIONS

Green, "Solution routes to III-V semiconductor quantum dots", Current Opinion in Solid State and Materials Science 6, pp. 355-363 (2002).

Fischer et al., "Completely Miscible Nanocomposites", Angew. Chem. Int. Ed. 2011, 50, 7811-7814.

M. J. Benitez, "Structural and magnetic characterization of self-assembled iron oxide nanoparticle arrays," Journal of Physics: Condensed Matter, vol. 23, No. 12, Mar. 30, 2011; available on-line at http://arxiv.org/ftp/arxiv/papers/1010/1010.0938.pdf.

* cited by examiner

METHOD FOR MAKING A PERPENDICULAR MAGNETIC RECORDING DISK WITH TEMPLATE LAYER FORMED OF NANOPARTICLES EMBEDDED IN A POLYMER MATERIAL

RELATED APPLICATION

This application is related to concurrently-filed application Ser. No. 13/772,110 titled "PERPENDICULAR MAGNETIC RECORDING DISK WITH TEMPLATE LAYER FORMED OF NANOPARTICLES EMBEDDED IN A POLYMER MATERIAL".

BACKGROUND OF THE INVENTION

1. Field of the Invention

This invention relates generally to perpendicular magnetic recording media, such as perpendicular magnetic recording disks for use in magnetic recording hard disk drives, and more particularly to a continuous-media type of perpendicular magnetic recording disk with a granular cobalt-alloy recording layer having controlled grain size.

2. Description of the Related Art

In a "continuous-media" perpendicular magnetic recording disk, the recording layer is a continuous layer of granular cobalt-alloy magnetic material that becomes formed into concentric data tracks containing the magnetically recorded data bits when the write head writes on the magnetic material. Continuous-media disks, to which the present invention is directed, are to be distinguished from "bit-patterned-media" (BPM) disks, which have been proposed to increase data density. In BPM disks, the magnetizable material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to continuous-media disks wherein a single "bit" may have multiple magnetic domains separated by domain walls.

FIG. 1 is a schematic of a cross-section of a prior art perpendicular magnetic recording continuous-media disk. The disk includes a disk substrate and an optional "soft" or relatively low-coercivity magnetically permeable underlayer (SUL). The SUL serves as a flux return path for the field from the write pole to the return pole of the recording head. The material for the recording layer (RL) is a granular ferromagnetic cobalt (Co) alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce intergranular exchange coupling, which is responsible for high intrinsic media noise. Enhancement of grain segregation in the cobalt alloy RL is achieved by the addition of oxides, including oxides of Si, Ta, Ti, Nb, B, C, and W. These oxides (Ox) tend to precipitate to the grain boundaries as shown in FIG. 1, and together with the elements of the cobalt alloy form nonmagnetic intergranular material. An optional capping layer (CP), such as a granular Co alloy without added oxides or with smaller amounts of oxides than the RL, is typically deposited on the RL to mediate the intergranular coupling of the grains of the RL, and a protective overcoat (OC) such as a layer of amorphous diamond-like carbon is deposited on the CP.

The Co alloy RL has substantially out-of-plane or perpendicular magnetic anisotropy as a result of the c-axis of its hexagonal-close-pack (hcp) crystalline structure being induced to grow substantially perpendicular to the plane of the layer during deposition. To induce this growth of the hcp RL, intermediate layers of ruthenium (Ru1 and Ru2) are located below the RL. Ruthenium (Ru) and certain Ru alloys, such as RuCr, are nonmagnetic hcp materials that induce the growth of the RL. An optional seed layer (SL) may be formed on the SUL prior to deposition of Ru1.

The enhancement of segregation of the magnetic grains in the RL by the additive oxides as segregants is important for achieving high areal density and recording performance. The intergranular Ox segregant material not only decouples intergranular exchange but also exerts control on the size and distribution of the magnetic grains in the RL. Current disk fabrication methods achieve this segregated RL by growing the RL on the Ru2 layer that exhibits columnar growth of the Ru or Ru-alloy grains.

FIG. 2 is a transmission electron microscopy (TEM) image of a portion of the surface of a prior art CoPtCr—$SiO_2$ RL from a disk similar to that shown in FIG. 1. FIG. 2 shows well-segregated CoPtCr magnetic grains separated by intergranular $SiO_2$ (white areas). However, as is apparent from FIG. 2, there is a relatively wide variation in the size of the magnetic grains and thus the grain-to-grain distance. A large grain size distribution is undesirable because it results in a variation in magnetic recording properties across the disk and because some of the smaller grains can be thermally unstable, resulting in loss of data. FIG. 2 also illustrates the randomness of grain locations. Because the nucleation sites during the sputtering deposition are randomly distributed by nature, there is no control of the grain locations. The amount of Ox segregants inside the RL needs to be sufficient to provide adequate grain-to-grain separation, but not too high to destroy the thermal stability of the RL. The typical content of the Ox segregants is about 20% in volume, and the grain boundary thickness is typically between about 1.0 and 1.5 nm.

To achieve high areal density of 1 to 5 Terabits/$in^2$ and beyond, it is desirable to have high uniformity (or tighter distribution) of the grains within the RL, mainly for the following three structural parameters: grain diameter (i.e., the diameter of a circle that would have the same area as the grain), grain-to-grain distance (i.e., the distance between the centers of adjacent grains or "pitch") and grain boundary thickness. Narrower distribution of these three structural parameters will lead to narrower distributions of magnetic exchange interaction and magnetic anisotropy strength, both of which are desirable.

Thus the prior art RL shown in FIG. 2 is far from ideal. First, the grains have an irregular polygonal shape with a large size distribution. The average grain diameter is about 8-11 nm with a relatively large size distribution of about 18-22%. The distribution information is obtained by measuring neighboring grain-to-grain distances in high resolution scanning electron microscopy (SEM) or TEM images and then fitting with a lognormal function. Distribution value as referred to in this application shall mean the width of the lognormal function. Second, the location of the grain centers is highly random, which means there is no short range or local ordering, i.e., no pattern within approximately 3-5 grain distances. Third, the thickness of the grain boundaries (the Ox segregants seen as white areas in FIG. 2) has an even wider distribution. Typical grain boundary thickness is 0.9-1.2 nm with a distribution of about 50 to 70%. Because the intergranular exchange is an exponential decay function of boundary thickness, the large distribution of boundary thickness leads to large fluctuation of exchange between grains and thus a significant signal-to-ratio (SNR) loss. According to Wang et al, "Understanding Noise Mechanism in Small Grain Size Perpendicular Thin Film Media", *IEEE Trans Mag* 46, 2391 (2010), a large distribution of boundary thickness can cause 3 to 10 dB SNR loss, and small-grain media suffer even more SNR loss than large-grain media.

What is needed is a continuous-media perpendicular magnetic recording disk that has a granular cobalt alloy RL with additive oxides with well-segregated magnetic grains with a narrow distribution of grain diameter and grain boundary thickness.

SUMMARY OF THE INVENTION

The invention relates to a continuous-media perpendicular magnetic recording disk with a granular Co alloy recording layer (RL) having controlled grain size distribution and a method for making the disk with controlled location of nucleation sites. The disk includes a substrate with a template layer formed on the substrate. The template layer comprises nanoparticles spaced-apart and partially embedded within a polymer material having a functional end group. The nanoparticles protrude above the surface of the polymer material. The template layer is formed by depositing on the substrate a solution of a polymer with a functional end group and the nanoparticles, allowing the solution to dry, annealing the polymer layer to thereby form a polymer layer with embedded spaced-apart nanoparticles, and then etching the polymer layer to a depth sufficient to partially expose the nanoparticles so they protrude above the surface of the polymer layer.

A seed layer, like a NiTa alloy or an amorphous CoFeTaZr alloy, covers the surface of the polymer material and the protruding nanoparticles and an underlayer or Ru or a Ru alloy covers the seed layer. A perpendicular magnetic RL comprising a layer of granular ferromagnetic Co alloy and one or more oxides of one or more of Si, Ta, Ti Nb, B, C, and W is formed on the underlayer.

The seed layer generally replicates the surface topology of the underlying template layer. The Ru or Ru alloy underlayer defines the texture for the growth of the Co alloy RL. Because the nanoparticles with protruding top surfaces serve as the controlled nucleation sites, the Ru or Ru alloy atoms preferentially nucleate on top of the small "bumps" created by the underlying protruding nanoparticles. The Ru grains are thus highly disconnected, which results in a monolayer of Ru or Ru alloy islands with an arrangement that generally replicates the arrangement of the underlying spaced-apart nanoparticles. The Co alloy has a hexagonal-close-packed (hcp) crystalline structure having the c-axis oriented substantially out-of-plane or perpendicular to the RL. The Ru islands promote the growth of the Co alloy grains of the RL so that the c-axis of the hcp Co alloy material is oriented substantially perpendicular, thereby resulting in perpendicular magnetic anisotropy. The oxide segregants generally form as intergranular material between the Co alloy grains.

The nanoparticle-to-nanoparticle distances can be controlled during the formation of the template layer by the annealing step, preferably by controlling the duration of solvent annealing. This enables control of the Co alloy grain diameter distribution as well as grain-to-grain distance distribution.

For a fuller understanding of the nature and advantages of the present invention, reference should be made to the following detailed description taken together with the accompanying figures.

DETAILED DESCRIPTION OF THE INVENTION

Figure 3:
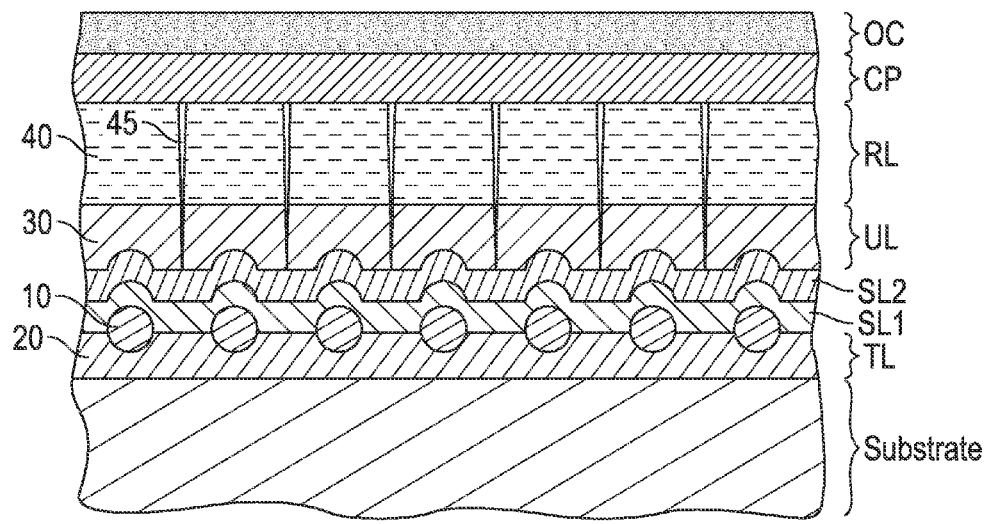
FIG. 3 is a side sectional view of the continuous-media perpendicular magnetic recording disk according to this invention illustrating a template layer (TL) and at least one seed layer (SL1) located between the substrate and the Ru or Ru alloy underlayer (UL).

FIG. 3 is a side sectional view of the continuous-media perpendicular magnetic recording disk according to the invention. In the disk according to this invention a template layer (TL) and at least one seed layer (SL1), both of which will be described in detail below, are located between the substrate and the Ru or Ru alloy underlayer (UL).

Figure 1:
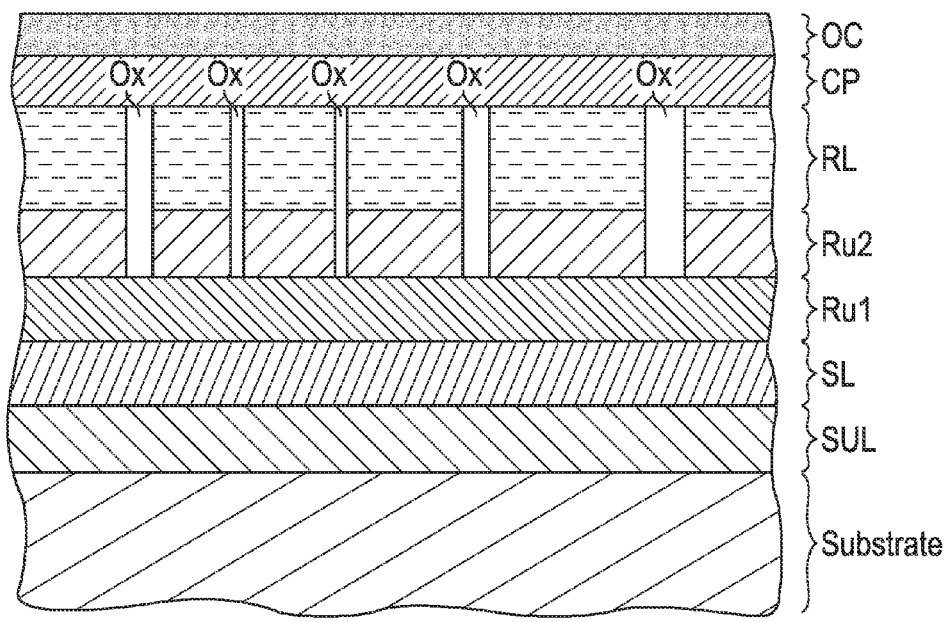
FIG. 1 is a schematic of a cross-section of a perpendicular magnetic recording disk according to the prior art.

The disk substrate may be any commercially available glass substrate or a wafer or disk of a material such as, but not limited to, silicon (Si), fused quartz, carbon, or a silicon nitride (SiN$_x$). An optional conventional SUL (not shown in FIG. 3) may be located between the substrate and the TL. The SUL may be a single soft magnetic layer (as shown in FIG. 1) or a multilayer of soft magnetic layers separated by nonmagnetic layers. The SUL layer or layers are formed of amorphous magnetically permeable materials such as alloys of CoNiFe, FeCoB, CoCuFe, NiFe, FeAlSi, FeTaN, FeN, FeTaC, CoTaZr, CoFeB, and CoZrNb. The thickness of the SUL is typically in the range of approximately 20-400 nm.

An optional second seed layer (SL2) may be formed on SL1 and an underlayer (UL) of ruthenium (Ru) or a Ru alloy is formed on SL2, or SL1 if there is no SL2. The Ru or Ru alloy UL is formed as disconnected islands 30 over the SL2, or the SL1 if there is no SL2. The recording layer (RL) is a granular ferromagnetic cobalt (Co) alloy, such as a CoPtCr alloy or a CoPtCrB alloy, with intergranular oxides, including oxides of one or more of Si, Ta, Ti, Nb, B, C, and W. The Co alloy has a hexagonal-close-packed (hcp) crystalline structure having the c-axis oriented substantially out-of-plane or perpendicular to the RL. The Ru islands 30 of the UL promote the growth of the Co alloy grains 40 of the RL so that the c-axis of the hcp Co alloy material is oriented substantially perpendicular, thereby resulting in perpendicular magnetic anisotropy. The oxide segregants generally form as intergranular material 45 between the Co alloy grains 40.

An optional conventional capping layer (CP), such as a granular Co alloy without added oxides or with smaller amounts of oxides than the RL, is typically deposited on the RL to mediate the intergranular coupling of the grains of the RL. A conventional protective overcoat (OC) such as a layer of amorphous diamond-like carbon is typically deposited on the CP, or on the RL if there is no CP.

The TL comprises nanoparticles 10 spaced-apart by and embedded within a matrix of polymer material 20. As shown in FIG. 3, the nanoparticles have upper surfaces not covered by the polymer material that are exposed prior to deposition of SL1.

Nanoparticles (also called nanocrystals) include small sub-100 nm sized crystalline particles composed of materials such as CdSe, CdTe, PbSe, FePt, iron oxide (FeOx), Si, ZnO, Au, Ru, Cu, Ag, and vanadium oxide ($VO_x$). Nanoparticles can be synthesized in a variety of sizes and with narrow size distributions. For example, CdSe nanoparticles are commercially available with diameters ranging from 2-7 nm. Other semiconductor nanoparticles are also available. This includes III-V semiconductors as described in D. V. Talapin, *MRS Bulletin* 37, 63-71 (2012) and in Green, "Solution routes to III-V semiconductor quantum dots", *Current Opinion in Solid State and Materials Science* 6, pp. 355-363 (2002).

Figure 4A:
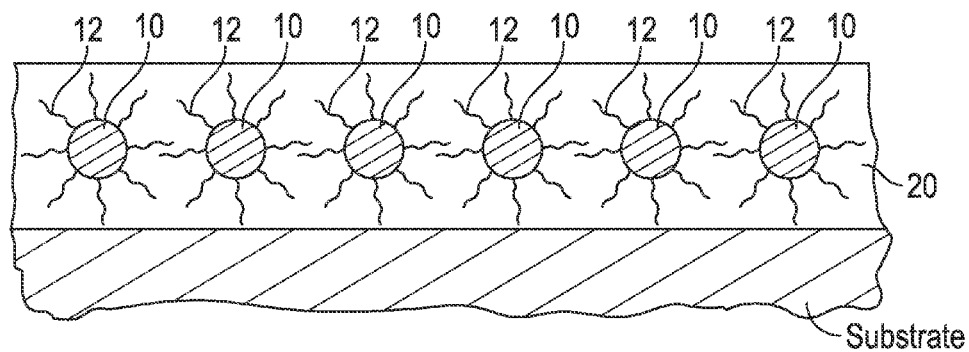
FIG. 4A is a side sectional schematic showing a first step in the method of forming the template layer (TL) in the disk according to the invention.
Figure 4B:
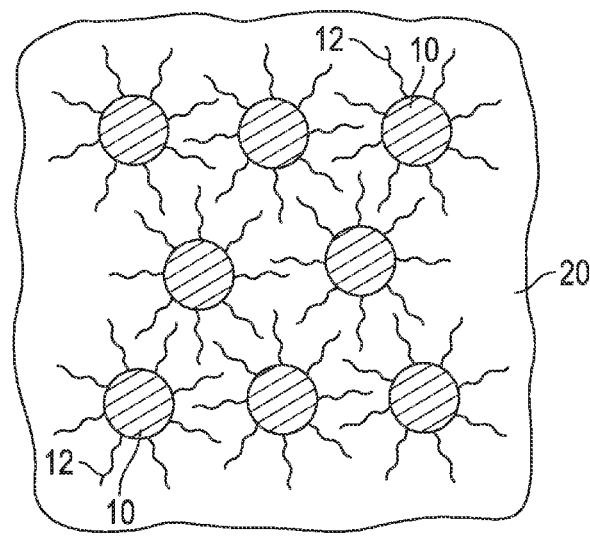
FIG. 4B is a top schematic showing the generally hexagonal close packed (hcp) short range ordering of the nanoparticles of the TL depicted in FIG. 4A.

The invention will be described for an example where the nanoparticles are iron-oxide ($Fe_3O_4$), and the polymer material is polystyrene with an end group of COOH. FIG. 4A is a side sectional schematic showing a first step in the method of forming the TL. A film comprising $Fe_3O_4$ nanoparticles 10 embedded in the polymer material 20 is formed on the substrate surface. The nanoparticles 10 are separated by the attached polystyrene chains 12. As depicted in FIG. 4A and the top schematic of FIG. 4B, the nanoparticles 10 have short range ordering within approximately 3-5 grain distances, which means that within this short range they are arranged in a generally uniform pattern on the substrate surface. The film is formed by spin coating a solution of the nanoparticles and polymer material on the substrate surface and allowing the solution dry, although other methods of dispersal are possible. $Fe_3O_4$ nanocrystals with a diameter of between about 1-10 nm and having polystyrene ligands with molecular weight between about 0.3-10 kg/mol are dissolved in toluene (or other solvent) at a concentration of about 1-25 mg/ml. A single layer of $Fe_3O_4$ nanoparticles can be formed across the substrate surface with relatively high uniformity by proper selection of the concentration of nanoparticles in the toluene solution and the spinning speed. During this process, the ligand molecules form cross-links to construct a continuous film of polystyrene, within which the $Fe_3O_4$ nanoparticles are embedded. The process for forming the film of $Fe_3O_4$ nanoparticles embedded in the matrix of polymer material to form a single layer of generally uniformly distributed $Fe_3O_4$ nanoparticles is described by Fischer et al., "Completely Miscible Nanocomposites", *Angew. Chem. Int. Ed.* 2011, 50, 7811-7814.

Figure 4C:
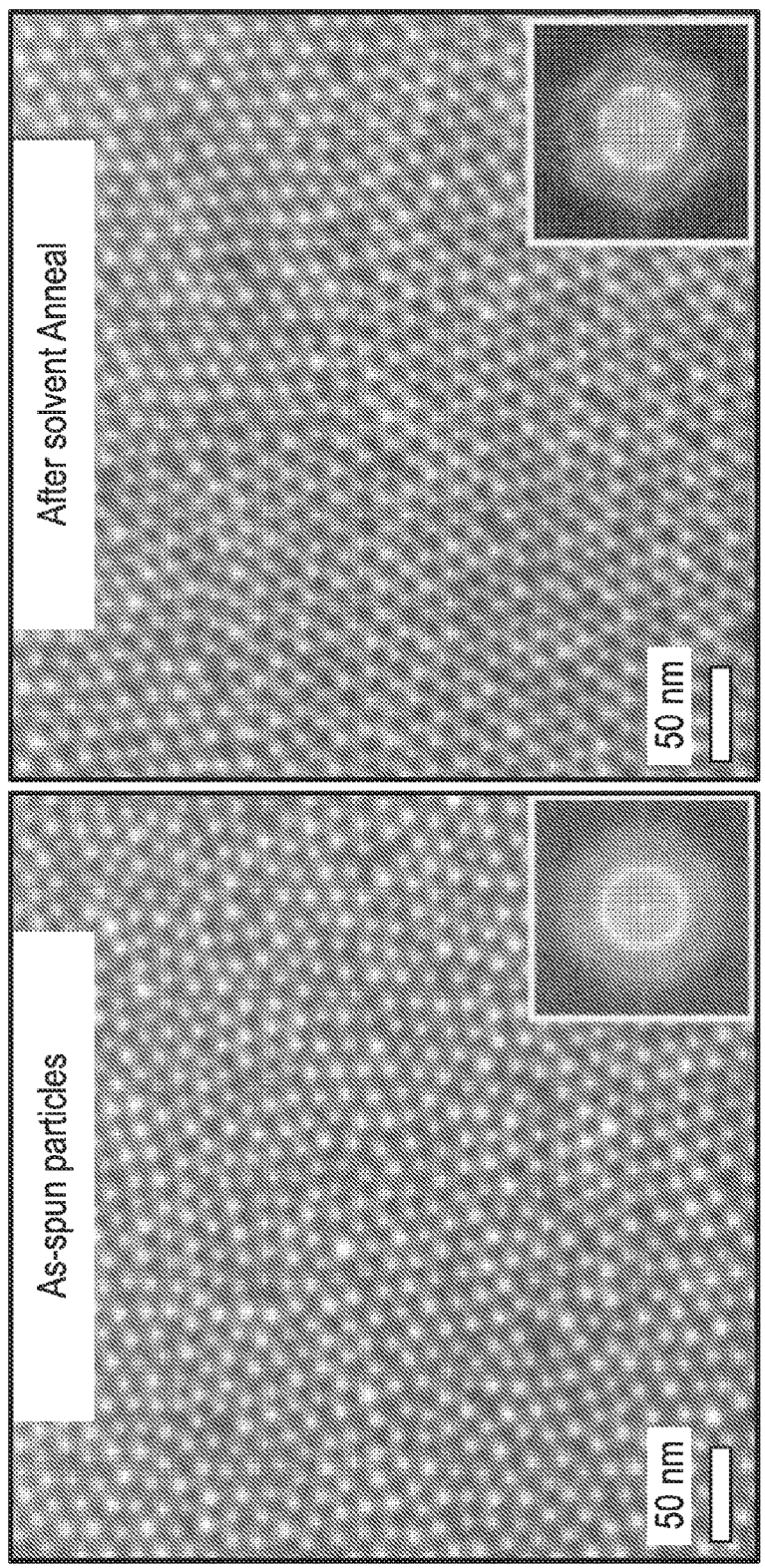
FIG. 4C is an SEM image showing a comparison of the array of nanoparticles of the TL as spin-coated (left side of FIG. 4C) and after solvent annealing (right side of FIG. 4C), wherein the inset in each figure is the diffraction pattern generated by Fast Fourier Transformation of the entire image.

As an optional step, after the solution has been applied to the substrate surface the substrate may be solvent annealed or thermally annealed, or both, for example by exposing the spin-coated film to a toluene (or other solvent) vapor or by thermally annealing at 250° C., to facilitate organization of the nanoparticles into the generally more uniform pattern. The optional solvent annealing step adjusts the ordering of the array of nanoparticles. Solvent annealing is performed in an enclosed chamber filled with toluene vapor for a certain period of time, for example 30 minutes. During the solvent annealing process, toluene vapor penetrates the polystyrene matrix and causes swelling of the film. When the polystyrene swells, the $Fe_3O_4$ nanoparticles are able to move around and re-assemble to form a more uniform or closer packed pattern. FIG. 4C shows a comparison of the array of $Fe_3O_4$ nanoparticles as spin-coated (left side of FIG. 4 C) and after solvent annealing for 30 minutes (right side of FIG. 4C), and illustrates the improvement in ordering, particularly the short range ordering, as a result of the solvent annealing. The distribution of particle-to-particle distance can be controlled by the solvent annealing step. For example, as-spun particles normally have a distribution around 10-15%, and particles solvent annealed for 30 minutes have a distribution around 5-10%. Solvent annealing for an even longer time would achieve an even smaller distribution.

Figure 4D:
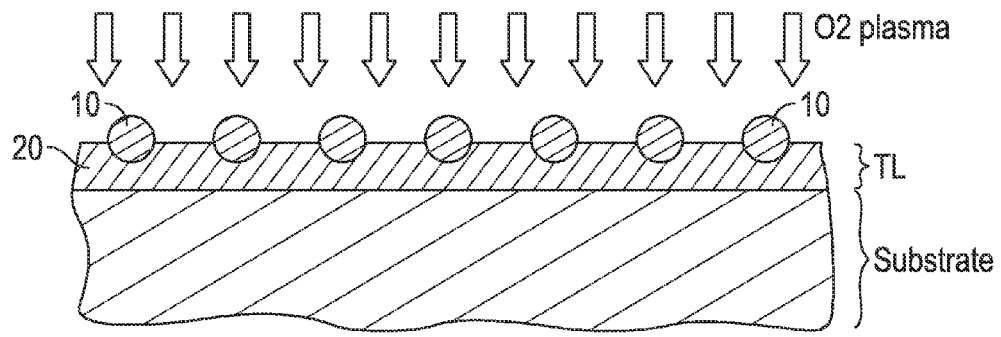
FIG. 4D illustrates the step of etching away a portion of the polymer material of the film shown in FIG. 4A to expose the surfaces of the nanoparticles of the TL.

FIG. 4D illustrates the step of etching away a portion of the polymer material 20 of the film shown in FIG. 4A to expose the surfaces of the $Fe_3O_4$ nanoparticles 10. This results in the $Fe_3O_4$ nanoparticles 10 being only partially embedded in the matrix of polymer material 20. An oxygen ($O_2$) plasma reacts with the polystyrene chains and turns them into gas and water vapor, which are pumped away. Because the nanoparticles are an oxide they are not significantly affected by the $O_2$ plasma. By controlling the plasma treating time and the plasma intensity, the amount of polystyrene stripped away can be controlled, and thus the amount of protrusion of the $Fe_3O_4$ nanoparticles can be controlled. The preferred amount of protrusion of the $Fe_3O_4$ nanoparticles is between about 35 to 75 percent of the diameter of the nanoparticles. This is accomplished with a $O_2$ plasma treatment for about 30-50 seconds. After the partial removal of the polystyrene, the surface has topographic protrusions of $Fe_3O_4$ nanoparticles 10, as well as a chemical contrast between the $Fe_3O_4$ nanoparticle 10 surfaces and the surrounding remaining polystyrene material 20. While etching of sufficient polymer material to expose the surfaces of the nanoparticles is preferred because it results in both a topographic surface and a chemical contrast, the polymer material may be etched to a lesser extent so that the nanoparticles may still retain a thin film of polymer material but still produce a topographic surface.

Figure 4E:
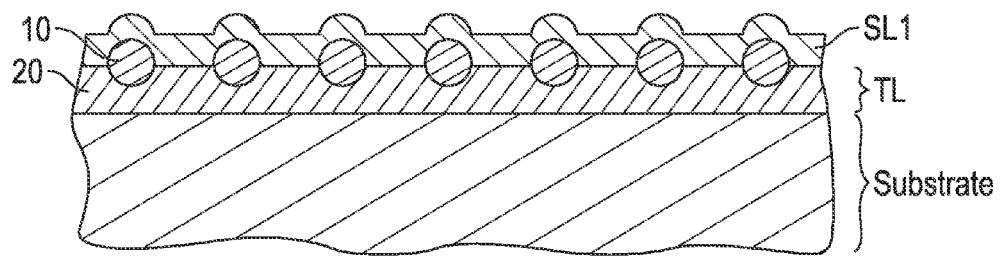
FIG. 4E illustrates the step of homogenizing the surface of the TL depicted in FIG. 4D.

FIG. 4E illustrates the step of homogenizing the surface of FIG. 4D. A thin amorphous metallic layer serves as a first seed layer (SL1). SL1 is preferably a NiTa alloy or a CoFeTaZr alloy, sputter deposited onto the exposed surfaces of the $Fe_3O_4$ nanoparticles 10 and the surface of the remaining polystyrene material 20 to a thickness between about 1 to 5 nm. The SL1 thus conforms to and generally replicates the topographic surface of the exposed nanoparticles 10 and surrounding polymer material 20. At this thickness, SL1 is adequate to cover the entire surface, but not too thick to wash out the protrusion features of the nanoparticles 10. After this step, the TL with SL1 is complete and ready for templated growth of the RL.

Figure 4F:
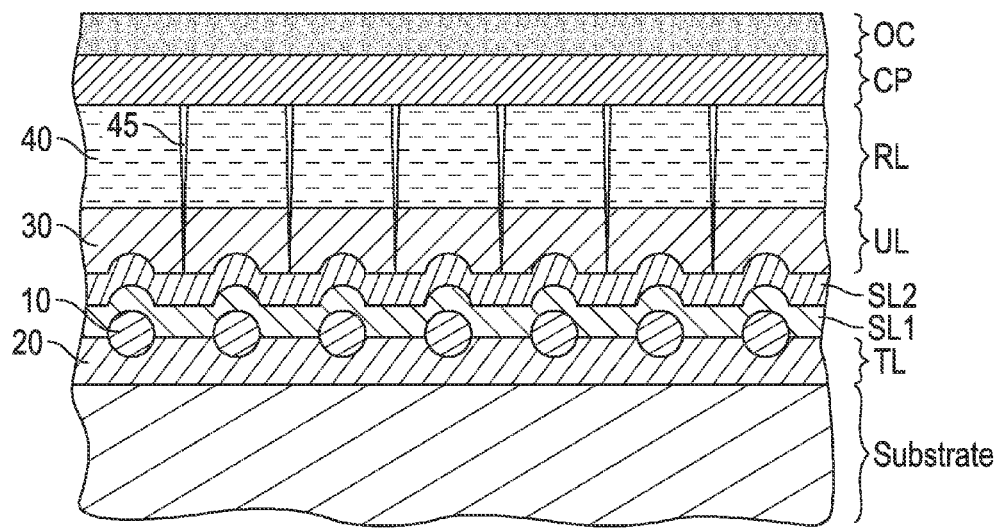
FIG. 4F illustrates the step of depositing the remaining layers of the disk according to the invention.

FIG. 4F illustrates the steps of depositing the remaining layers of the disk according to the invention. An optional second seed layer (SL2) is sputter deposited onto SL1. SL2 is a seed layer for the growth of the Ru or Ru alloy UL. SL2 is preferably a highly crystalline material, like a NiW alloy, with a thickness between about 3 to 10 nm, but SL2 may also be formed of NiV or NiFeW alloys. The SL2 improves the crystallinity of the hcp Ru or Ru alloy UL. Next a Ru layer is sputter deposited as the UL to a thickness between about 5 to 15 nm. The Ru UL defines the (0001) texture for the growth of the Co alloy RL. Due to the surface topology of the underlying SL1 and optional SL2, the Ru atoms preferentially nucleate on top of the small "bumps" created by the underlying $Fe_3O_4$ nanoparticles 10. The Ru grains are thus highly disconnected. This results in a monolayer of Ru islands 30 with an arrangement that replicates the arrangement of the underlying $Fe_3O_4$ nanoparticles 10. The pressure of Ar gas is an important factor during the sputtering of Ru because it determines the roughness of the Ru surface. Low Ar pressure (1-10 mTorr) leads to a rather smooth Ru surface and high Ar pressure (10-50 mTorr) leads to higher roughness. The fine control of Ru roughness by Ar pressure can be used to tune the extent of segregation among the RL grains which are grown on top of the Ru surface. Higher roughness in Ru causes stronger separation among the magnetic grains and less magnetic exchange coupling. In this invention, the Ar pressure is preferably between about 10 to 50 mTorr. While Ru is a commonly used material for the UL, the UL may also be formed of Ru-based alloys such as a RuCr alloy.

Figure 5:
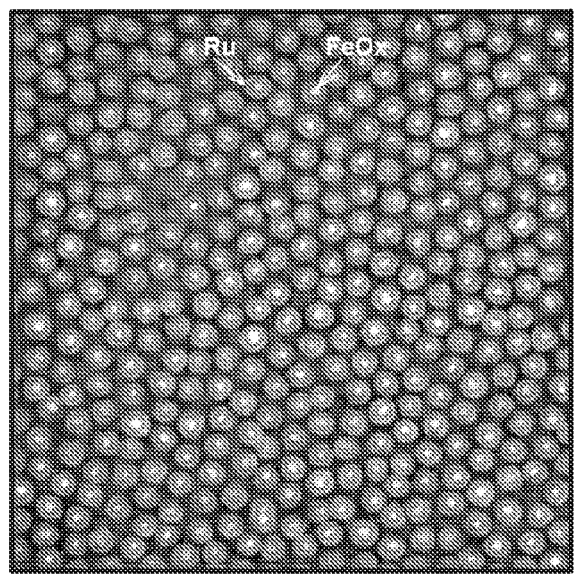
FIG. 5 is an Electron Energy Loss Spectroscopy-Scanning Transmission Electron Microscopy (EELS-STEM) composite image of a 2.3 nm Ru layer formed by templated growth on top of a template layer (TL) according to the invention.

FIG. 5 is an EELS-STEM composite image of a 2.3 nm Ru layer formed by templated growth on top of a TL according to the invention. The TL was $Fe_3O_4$ nanoparticles partially embedded in polystyrene material with a SL1 formed of a NiTa alloy. The circular grains are formed by Ru, and the white dot in the center of each grain is the location of the $Fe_3O_4$ nanoparticle, obtained from the Fe-signal in EELS. The white dot within each island show the mapping of the underlying Fe element, proving that the Ru islands are formed on top of the $Fe_3O_4$ nanoparticles. FIG. 5 also illustrates that the Ru islands have short range ordering, i.e., they form a generally uniform pattern within approximately 3-5 island distances.

Next the RL of a conventional Co alloy and one or more oxides is sputter deposited onto the Ru or Ru alloy UL. The RL is a granular ferromagnetic cobalt (Co) alloy, such as a CoPtCr alloy or a CoPtCrB alloy, with intergranular oxides, including oxides of one or more of Si, Ta, Ti, and Nb. The Co alloy has a hexagonal-close-packed (hcp) crystalline structure having the c-axis oriented substantially out-of-plane or perpendicular to the RL. The Ru islands 30 promote the growth of the Co alloy grains 40 of the RL so that the c-axis of the hcp Co alloy material is oriented substantially perpendicular, thereby resulting in perpendicular magnetic anisotropy. The oxide segregants generally form as intergranular material 45 between the Co alloy grains 40.

To complete the disk shown in FIG. 4F, an optional capping layer (CP) may be deposited on the RL, followed by the disk protective overcoat (OC). The CP typically consists of a ferromagnetic granular Co alloy, like a CoPtCr or CoPtCrB alloy, for mediating or controlling the intergranular exchange coupling in the RL. Thus the CP may have a greater amount of Cr and/or B than the RL, or a lesser amount of oxides than the RL. For example, the CP may have substantially the same Co alloy composition as the RL but have no oxides. As a result, the individual Co alloy grains of the CP are larger than the Co alloy grains of the RL and generally overlap multiple grains of the RL. The OC formed on the CP, or on the RL if there is no CP, may be an amorphous diamond-like carbon film or other known protective overcoat, such as silicon nitride (SiN).

Figure 2:
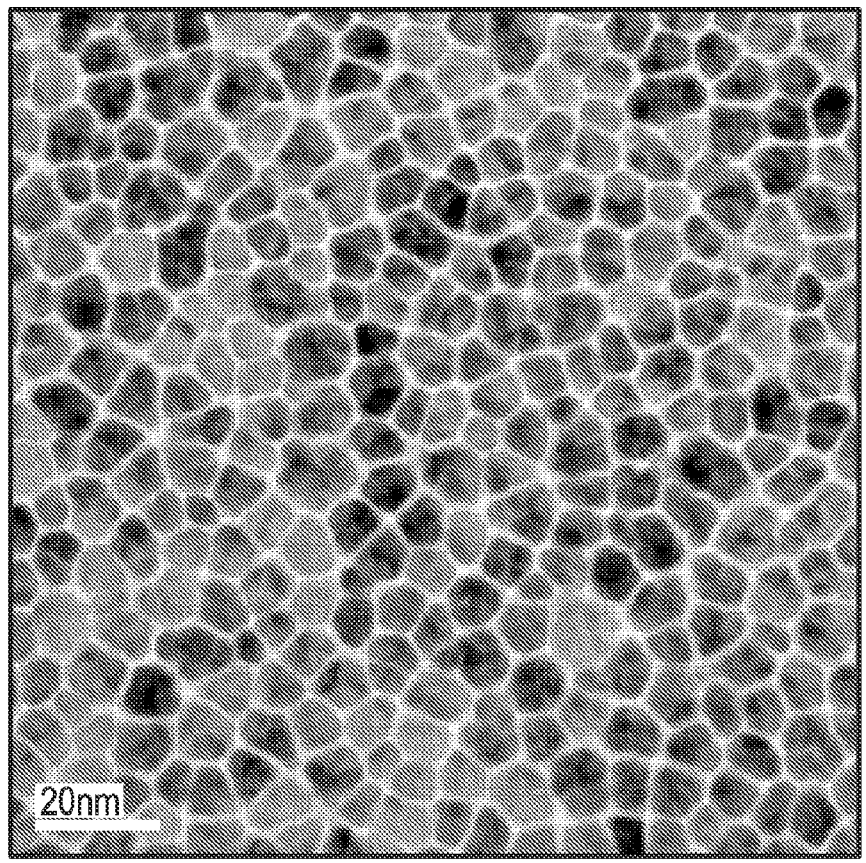
FIG. 2 is a transmission electron microscopy (TEM) image of a portion of a surface of a CoPtCr—SiO$_2$ recording layer of a prior art perpendicular magnetic recording disk similar to the disk depicted in FIG. 1.
Figure 6:
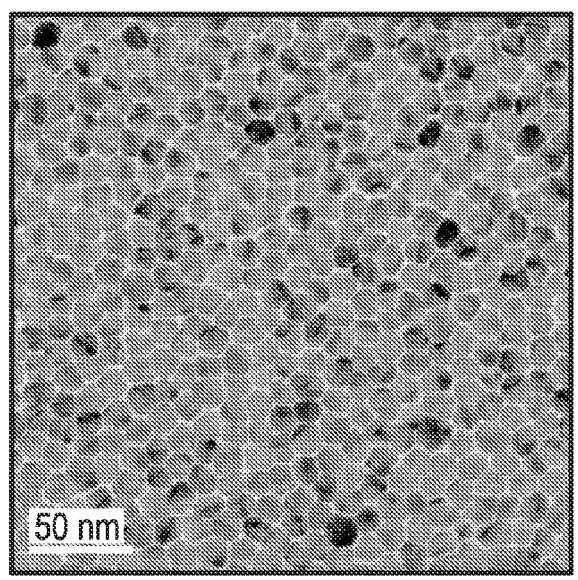
FIG. 6 is a TEM image of a portion of a surface of a CoPtCr—SiO$_2$ recording layer of a perpendicular magnetic recording disk according to the invention.

FIG. 6 is a TEM image of a portion of a surface of a CoPtCr—$SiO_2$ recording layer of a perpendicular magnetic recording disk according to the invention. FIG. 6 shows that the Co alloy grains have a generally hexagonal shape, as compared with the generally irregular shape of the grains in FIG. 2. More importantly, by comparison with the prior art of FIG. 2, in FIG. 6 the distribution of grain diameter is only about 8% and the boundary thickness is also more uniform. This smaller value of grain diameter distribution can be accomplished by the optional step of annealing, e.g., solvent annealing, as described above. While the invention can accomplish this very narrow distribution of 8% for the grain diameters, it has been found as part of this invention that this relatively low value can cause "synchronizing noise", i.e. noise with uniform peaks. Thus it may be desirable for continuous perpendicular magnetic recording media that the distribution of grain diameters be within about 10-15%. This can be accomplished by not performing the annealing step, so that the nanoparticles have the arrangement show in on the left side in FIG. 4C, or by reducing the length of time for the optional solvent annealing step.

The template layer (TL) for the disk of this invention has been described for $Fe_3O_4$ nanoparticles partially embedded in a polymer material of polystyrene with a functional end group of COOH. However, examples of other nanoparticles include, but are not limited to, zinc-oxide (ZnO), silver (Ag), gold (Au), cadmium selenide (CdSe), cobalt (Co), iron-platinum (FePt), copper (Cu), and vanadium oxide (VOx) (e.g., $VO_2$, $V_2O_3$, $V_2O_5$). Examples of other polymers include, but are not limited to, polydimethyl siloxane, polysiloxane, polyisoprene, polybutadiene, polyisobutylene polypropylene glycol, and polyethylene glycol. Examples of other functional end groups for the polymers include, but are not limited to, carbocyl group (COOH), hydroxyl group (OH), amino group ($NH(CH_2)_2NH_2$) and thiol group (CSH).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a perpendicular magnetic recording disk comprising:
   providing a substrate;
   depositing on the substrate a solution of a polymer with a functional end group and a plurality of nanoparticles;
   allowing the solution to dry, thereby forming a polymer layer with embedded spaced-apart nanoparticles;
   etching the polymer layer to a depth sufficient to partially expose the nanoparticles;
   depositing a seed layer over the etched polymer layer and the partially exposed nanoparticles;
   depositing an underlayer selected from Ru and a Ru alloy on the seed layer; and
   depositing a perpendicular magnetic recording layer on the underlayer, the recording layer comprising a layer of granular ferromagnetic Co alloy and one or more oxides of one or more of Si, Ta, Ti Nb, B, C, and W.

2. The method of claim 1 wherein the nanoparticles are $Fe_3O_4$ nanoparticles and the polymer is polystyrene.

3. The method of claim 1 wherein the functional end group is selected from the carbocyl group (COOH), the hydroxyl group (OH), the amino group (NH(CH2)2NH2) and the thiol group (CSH).

4. The method of claim 1 wherein the seed layer is selected from an amorphous NiTa alloy and an amorphous CoFeTaZr alloy.

5. The method of claim 1 wherein depositing the seed layer comprises depositing the seed layer to a thickness greater than or equal to 1 nm and less than or equal to 5 nm.

6. The method of claim 1 wherein the seed layer is a first seed layer and further comprising depositing a second seed layer on and in contact with the first seed layer, and wherein depositing the underlayer comprises depositing the underlayer on and in contact with the second seed layer.

7. The method of claim 6 wherein the first seed layer comprises a NiTa alloy and the second seed layer comprises a NiW alloy.

8. The method of claim 1 wherein etching the polymer layer comprises etching the polymer layer to a depth sufficient to expose between 35 to 75 percent of the diameter of the nanoparticles above the surface of the polymer layer.

9. The method of claim 1 further comprising, after allowing the solution to dry, annealing the polymer layer.

10. The method of claim 9 wherein annealing comprises solvent annealing.

11. The method of claim 10 wherein solvent annealing comprises solvent annealing for a time sufficient to cause the nanoparticle-to-nanoparticle distances to have a distribution greater than or equal to 5% and less than or equal to 10%.

12. The method of claim 10 wherein solvent annealing comprises solvent annealing for a time sufficient to cause the nanoparticle-to-nanoparticle distances to have a distribution greater than or equal to 10% and less than or equal to 15%.

13. The method of claim 1 further comprising depositing a soft magnetically permeable underlayer (SUL) on the substrate and wherein depositing said solution comprises depositing said solution on the SUL.

14. A method for making a perpendicular magnetic recording disk comprising:
providing a substrate;
depositing on the substrate a solution of polystyrene with a functional end group and a plurality of $Fe_3O_4$ nanoparticles;
allowing the solution to dry, thereby forming a polystyrene layer with embedded spaced-apart $Fe_3O_4$ nanoparticles;
etching the polystyrene layer to a depth sufficient to partially expose the $Fe_3O_4$ nanoparticles;
depositing a seed layer selected from an amorphous NiTa alloy and an amorphous CoFeTaZr alloy over the etched polystyrene layer and the partially exposed $Fe_3O_4$ nanoparticles;
depositing an underlayer selected from Ru and a Ru alloy on the seed layer; and
depositing a perpendicular magnetic recording layer on the underlayer, the recording layer comprising a layer of granular ferromagnetic Co alloy and one or more oxides of one or more of Si, Ta, Ti Nb, B, C, and W.

15. The method of claim 14 wherein the functional end group is selected from the carbocyl group (COOH), the hydroxyl group (OH), the amino group (NH(CH2)2NH2) and the thiol group (CSH).

16. The method of claim 14 wherein depositing the seed layer comprises depositing the seed layer to a thickness greater than or equal to 1 nm and less than or equal to 5 nm.

17. The method of claim 14 wherein the seed layer is a first seed layer and further comprising depositing a second seed layer on and in contact with the first seed layer, and wherein depositing the underlayer comprises depositing the underlayer on and in contact with the second seed layer.

18. The method of claim 17 wherein the first seed layer comprises a NiTa alloy and the second seed layer comprises a NiW alloy.

19. The method of claim 14 wherein etching the polystyrene layer comprises etching the polymer layer to a depth sufficient to expose between 35 to 75 percent of the diameter of the nanoparticles above the surface of the polystyrene layer.

20. The method of claim 14 further comprising, after allowing the solution to dry, annealing the polymer layer.

21. The method of claim 20 wherein annealing comprises solvent annealing.

22. The method of claim 21 wherein solvent annealing comprises solvent annealing for a time sufficient to cause the nanoparticle-to-nanoparticle distances to have a distribution greater than or equal to 5% and less than or equal to 10%.

23. The method of claim 21 wherein solvent annealing comprises solvent annealing for a time sufficient to cause the nanoparticle-to-nanoparticle distances to have a distribution greater than or equal to 10% and less than or equal to 15%.

24. The method of claim 14 further comprising depositing a soft magnetically permeable underlayer (SUL) on the substrate and wherein depositing said solution comprises depositing said solution on the SUL.

* * * * *